United States Patent
Haider

(10) Patent No.: US 8,940,069 B2
(45) Date of Patent: Jan. 27, 2015

(54) INTERIOR AIR FILTER, FILTER HOLDER AND FILTER ARRANGEMENT

(71) Applicant: Mann+Hummel GmbH, Ludwigsburg (DE)

(72) Inventor: Dominik Haider, Dingolfing (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/886,755

(22) Filed: May 3, 2013

(65) Prior Publication Data

US 2013/0232933 A1    Sep. 12, 2013

Related U.S. Application Data

(63) Continuation of application No. PCT/EP2011/069410, filed on Nov. 4, 2011.

(30) Foreign Application Priority Data

Nov. 4, 2010  (DE) .......................... 10 2010 050 222

(51) Int. Cl.
*B01D 46/52*  (2006.01)
*B01D 46/00*  (2006.01)
*B01D 46/10*  (2006.01)

(52) U.S. Cl.
CPC .......... *B01D 46/521* (2013.01); *B01D 46/0006* (2013.01); *B01D 46/10* (2013.01); *B01D 2265/026* (2013.01); *B01D 2271/02* (2013.01); *Y10S 55/31* (2013.01)
USPC ................... 55/497; 55/481; 55/511; 55/521; 55/DIG. 31

(58) Field of Classification Search
CPC .. B01D 46/0006; B01D 46/10; B01D 46/521; B01D 2265/026; B01D 2271/02; B01D 2271/022
USPC ..................... 55/481, 497, 511, 521, DIG. 31
See application file for complete search history.

(56) References Cited

U.S. PATENT DOCUMENTS

| 8,613,785 B1 * | 12/2013 | Davis .............................. 55/495 |
| 2011/0061352 A1 * | 3/2011 | Stahl et al. ................... 55/385.3 |

FOREIGN PATENT DOCUMENTS

| DE | 19532436 | 1/1997 |
| DE | 10135691 | 2/2003 |

(Continued)

OTHER PUBLICATIONS

Machine translation of DE102009042588, which was published Jun. 17, 2010.*

(Continued)

*Primary Examiner* — Robert Clemente
(74) *Attorney, Agent, or Firm* — James Hasselbeck

(57) ABSTRACT

An interior air filter for a motor vehicle has a fold pack having a first side. A material with a first leg and a second leg is disposed on the first side. The first leg is attached to the first side and the second leg has a width that is greater than a height of the fold pack. The material strip forms at least partially a head band or a side band of the fold pack. A filter receptacle for the interior air filter has a slanted wall and a mounting and removal opening through which the interior air filter is inserted or removed from the filter receptacle in a mounting and removal direction. The slanted wall extends at an angle that corresponds to an angle defined by the second leg of the material strip of the interior air filter and a contact surface of the filter receptacle.

11 Claims, 4 Drawing Sheets

(56) References Cited

FOREIGN PATENT DOCUMENTS

| | | | |
|---|---|---|---|
| DE | 10231696 | A1 * | 1/2004 |
| DE | 10324681 | A1 * | 12/2004 |
| DE | 102009042588 | | 6/2010 |

OTHER PUBLICATIONS

PCT Office Action of PCT/EP2011/069410, (document appears to be undated, so no date provided).

PCY ISA 210 search report, dated Jun. 1, 2012.

* cited by examiner

INTERIOR AIR FILTER, FILTER HOLDER AND FILTER ARRANGEMENT

CROSS-REFERENCE TO RELATED APPLICATIONS

This application is a continuation application of international application No. PCT/EP2011/069410 having an international filing date of 4 Nov. 2011 and designating the United States, the international application claiming a priority date of 4 Nov. 2010, based on prior filed German patent application No. 10 2010 050 222.7, the entire contents of the aforesaid international application and the aforesaid German patent application being incorporated herein by reference.

BACKGROUND OF THE INVENTION

The invention concerns a filter element, in particular an interior air filter for filtering air for the interior (passenger compartment, cabin) of a motor vehicle. Moreover, the invention concerns a housing for such a filter element and a filter arrangement with such a filter element.

A filter element of this kind serves for filtering fluid streams or gaseous media, for example, for filtering an air stream that is supplied to the vehicle interior of a motor vehicle. Even though the present invention can be applied to any type of filter element and filter arrangement, the present invention as well as the problem to be solved will be explained in the following for a filter element for filtering air for the interior of a motor vehicle. In the following, such filters will be referred to for short as automotive interior air filter or simply interior air filter or cabin air filter.

With increasing air pollution, in particular in large cities, in combination with the use of modern air-conditioning devices, it is desirable and also necessary to purify by means of suitable filters the air that is supplied from the exterior into the interior of a motor vehicle and treated and air-conditioned. For this purpose, for example, particle filters, odor filters or their combination with each other are conceivable which remove or absorb airborne particulate material, particles and odors as much as possible from the ambient air. Such filters for filtering air for the interior of a motor vehicle are generally known in a plurality of embodiments and variants so that their configuration and function will be explained only briefly in the following.

Since the efficiency of filters depends in particular on the size of the surface area through which the air flows, in automotive interior air filters primarily zigzag-shaped folded filter media are used that are referred to also as pleated filter media. By folding the employed filter medium, depending on the height of the folds, the fold spacing, and the degree of compression of this accordion-like fold pack or the different fold sections of the filter medium, an enlargement of the filter surface area through which the air stream can flow is enabled. In order to be able to better handle and manipulate such filter elements with zigzag-shaped folded filter media, in particular with respect to assembly, reinforcement elements are often provided on the sides of the filter element across the filter pack of the folded medium. These reinforcement elements serve for lateral fixation and stabilization of the zigzag-shaped filter medium and are attached, for example, by means of a suitable adhesive, to the lateral edges of the fold pack. These reinforcement elements are referred to also as side bands. The filter element with the strip-shaped reinforcements and fortifications applied along folded longitudinal sides can therefore be handled and inserted in a simple way with regard to installation into a housing of a filter module or an appropriate filter receptacle, for example, into a filter housing or an air-conditioning device of motor vehicle, without causing damage to the filter element.

DE 10 135 691 discloses a filter insert for a filter housing that comprises a filter pack whose two exterior sides are each provided with a sealing strip. One of the sealing strips has a first leg and a second leg wherein the width of the first leg is matched to the height of the filter pack. The second leg has a reduced width in comparison to the first leg or the filter pack. In the inserted state in the filter housing, the second leg is contacting the first leg at an acute angle. When not installed, the first leg and the second leg are positioned relative to each other at an obtuse angle.

DE 195 32 436 C1 discloses a further filter insert with a fold pack that is provided along its two exterior sides with a seal, respectively. The width of the seal is greater than and at most twice the height of the exterior side of the fold pack. The seal has a fold.

With the afore described solutions, the filter pack can be reliable sealed in case of a correct installation in a filter housing. However, this sealing action in the described solutions is ensured only for the prescribed installation direction; for example, in case of installation opposite to the predetermined flow direction the seals are not effective. Since the projecting legs of the described solutions during installation can be pressed simply against the exterior walls of the filter pack, a faulty or erroneous installation is possible anytime.

DE 10 2009 042 588 A1 discloses a filter element in which defined geometrically shaped edge elements are attached to the edge of the filter pack.

SUMMARY OF THE INVENTION

It is therefore an object of the present invention, to provide an improved filter element. This object is solved by the subject matter of the independent claims.

Accordingly, a filter element with a filter pack is proposed that is provided at least on a first side of the filter pack with a material strip comprising a first leg and a second leg wherein the first leg is attached to the first side and the second leg has a width that is greater than the height of the fold pack.

The filter element is in particular embodied as an interior air filter for a motor vehicle. In operation of the filter element, a fluid to be filtered is passed through the fold pack in a predetermined flow direction.

Since the second leg is wider than the height of the fold pack, it is prevented that it can be folded in such a way against the side of the fold pack or the first leg that it would not project upwardly or downwardly past the fold pack. Instead, in case of folding the second leg down and toward a contact surface for the filter element, a certain residual angle remains between the first and the second leg. For an appropriate configuration of a filter receptacle, it is thus possible to define an unequivocal position for installation in the housing. Accordingly, the installation of the filter element opposite to a predetermine flow direction is prevented which increases, for example, the operative safety of the filter and simplifies installation. In this way, an arrangement is provided that prevents installation of the filter element in a wrong (upside down) position.

For example, the material strip is embodied as a sealing strip of the filter element. In this way, the material strip fulfills, in addition to the function of ensuring correct installation of the filter element, also a sealing function between the filter element and the corresponding filter receptacle in the assembled state. The material strip can be of the same material as the fold pack.

The fold pack of the filter element can have a head band and/or a side band which surrounds an end face of the fold pack or the fold profiles of the fold pack, preferably completely across the respective side. According to one embodiment of the filter element, a head band of the fold pack or a side band of the fold pack is formed at least partially by the material strip. In this way, a filter element can be produced with minimal production expenditure.

Preferably, the material strip of the filter element is designed such that the material strip has a fold between the first leg and the second leg. In particular, the material strip is preferably embodied as a single piece (monolithic) so that the first and the second legs are produced by folding.

Preferably, the material strip consists precisely of a first leg and a second leg and the angle between the first leg and the second leg is variable. In this way, it is possible with regard to production technology to realize a simple and inexpensive configuration that prevents installation of the filter element in a wrong position.

According to one embodiment of the filter element, the fold is positioned at a top edge of the fold pack or a bottom edge of the fold pack. In this way, the fold that represents the angular point of the first and the second legs is flush with the (top or bottom) edge of the fold pack. In this way, in case of folding down of the second leg onto a contact surface opposite the fold edge a trapezoidal cross-sectional shape of the filter element is provided.

In one embodiment of the filter element, the ratio of the width of the second leg to the height of the fold pack is 1.05 to 2.0. Preferably, this ratio is 1.3 to 1.8. For the proposed ratio range, in the mounted state of the filter element a beneficial angle between the first leg and the second leg of the filter element is provided. In particular, a reliable proper installation of the filter element and a satisfactory stability of the material strip are ensured.

According to a further embodiment of the filter element, on a second side of the fold pack a second material strip is arranged that has a further first leg, attached to the second side, and a further second leg having a width that is greater than the height of the fold pack. As a result of the second material strip that is configured e.g. in the same way as the first material strip, the reliability of proper installation of the filter element in the filter receptacle can be further increased. The second side can be a side that is opposite the first side of the fold pack. Alternatively, the first side and the second side can also have a common edge at a corner of the fold pack. The length of the second leg of the first material strip can be identical with, or different from, the width of the second leg of the second material strip.

According to a further embodiment of the filter element, the material strip has a third leg. An angular point between the second leg and the third leg is located at an end of the second leg that is facing away from the first leg. Preferably, for this purpose, the material strip has a further fold which forms the angular point of the third leg with the second leg. In particular, when the material strip is formed as a sealing strip, the sealing action between the filter element and the filter receptacle can be improved in this way. In addition, the stability of the filter element can be increased also.

Furthermore, a filter receptacle for the above described filter element is proposed that has a mounting and removal opening for the filter element. The filter receptacle comprises a slanted wall that extends at an angle which corresponds substantially to an angle defined by the second leg of the filter element and a contact surface for the filter element.

In this way, upon installation of the filter element in the proposed filter receptacle, the second leg of the filter element can extend along the slanted wall and an installation with exact fit is enabled in this way. In one embodiment of the filter receptacle, the slanted wall extends parallel to a mounting and removal direction for the filter element. In other words, when looking in the mounting and removal direction, the filter element has a trapezoidal cross-section. For example, the mounting and removal opening has an appropriate trapezoidal cross-section in this case.

In another embodiment, the slanted wall is positioned opposite the mounting and removal opening. In this case, the filter element is installed leading with the first side where the material strip is mounted, i.e., the first side being introduced first into the filter receptacle. The slanted wall forms in this case a kind of stop for the filter element or the second leg.

According to a further embodiment, the filter receptacle is suitable for the above described filter element with material strips on two sides. Accordingly, the filter receptacle has a further slanted wall that extends at an angle substantially identical to the angle that is defined by the second leg of the second material strip of the filter element and a contact surface for the filter element.

Furthermore, a filter arrangement is proposed that comprises a filter element according to the aforementioned embodiments as well as a filter receptacle of the afore described kind.

In one embodiment of such a filter arrangement, the second leg of the first material strip of the filter element is positioned at the slanted wall of the filter receptacle in the mounted state of the filter element.

In a further embodiment of such a filter arrangement, the filter element is arranged in the filter receptacle.

The filter receptacle of the aforementioned kind can be a part of a filter housing or can represent a filter housing. Accordingly, the slanted wall can also be a wall that is not located at the exterior side of a filter housing.

Further possible implementations of the invention comprise also combinations that are not explicitly mentioned of features or embodiment variants described above or in the following with respect to embodiments of the invention. In this connection, a person of skill in the art will also add individual aspects as improvements or supplements to the respective basic form of the invention.

Further configurations of the invention are subject matter of the dependent claims as well as of the embodiments of the invention disclosed in the following.

BRIEF DESCRIPTION OF THE DRAWING

In the following, the invention will be explained in more detail with the aid of embodiments with reference to the attached Figures.

In the Figures same reference characters identify the same, or functionally the same, elements inasmuch as nothing to the contrary is indicated.

DESCRIPTION OF THE PREFERRED EMBODIMENTS

Figure 1:
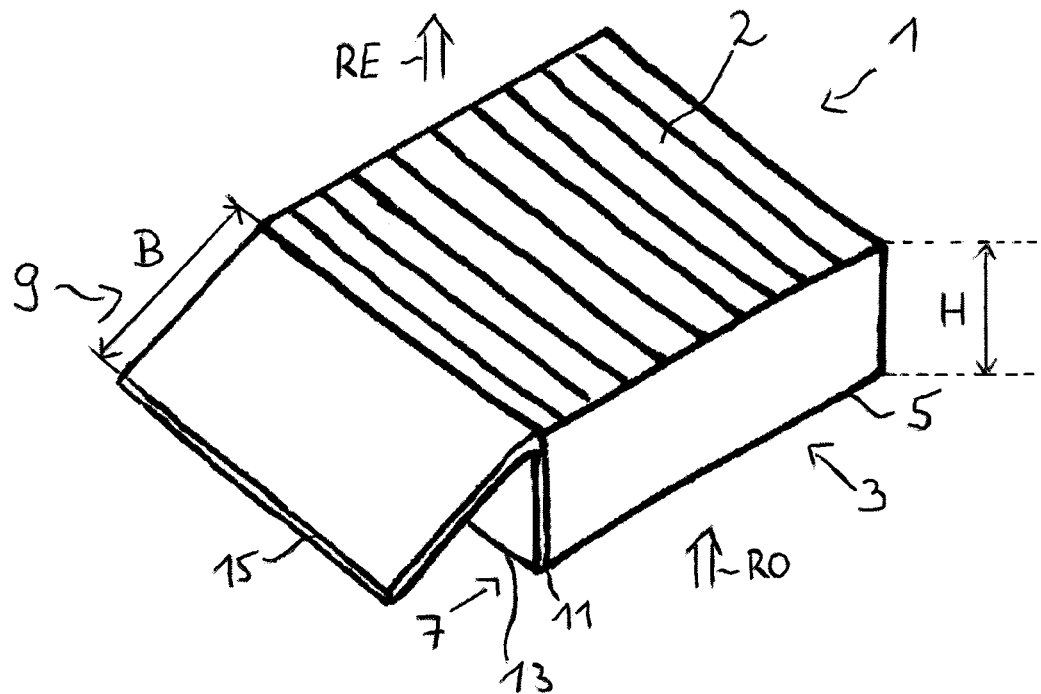
FIG. 1 shows in a schematic perspective illustration a first embodiment of a filter element.

FIG. 1 shows a schematic perspective illustration of a first embodiment of the filter element. The filter element 1 comprises a fold pack 2 of zigzag-shaped folded filter material. The filter material can be a filter nonwoven material that is suitable for filtering raw fluid, for example, interior air, exterior air or also combustion air of motor vehicles. The fold pack 2 in this context can be comprised of a multi-layer filter material in which absorber particles are arranged between different layers.

For example, in the orientation of FIG. 1 raw air RO is supplied from below to the fold pack 2, the fluid flows through the fold pack 2, and dirt or pollutants are retained in the filter material. Clean fluid RE exits as filtered fluid, for example, interior air for a motor vehicle, in upward direction. Of course, the fluid stream can also extend in a direction different from the direction illustrated in FIG. 1.

The fold pack 2 has a first side 3 on which a side band 5 closes off fold profiles, not visible, of the fold pack 2. The side band 5 is, for example, glued onto the fold profiles. In general, the side band material is somewhat more rigid than the filter material. In principle, however, the same materials can be used for the sidebands and the filter medium. Moreover, the filter element 1 has a side 7 on which a material strip 9 is arranged. The material strip 9 is attached to a hidden head band 11 of the fold pack 2 and has a first leg 13 and a second leg 15. The material of the head band 11 can be the same as the material of the side band 5. The fold pack 2 or the filter element 1 has a height H. The width of the first leg 13 is matched to the height H. The width B of the second leg 15 is greater than the height H.

In the present embodiment, the material strip 9 is of a monolithic (single piece) configuration wherein the legs 13, 15 are formed by folding the material strip 9 wherein the fold is located at the top edge of the filter element 1 or the fold pack 2.

The filter element 1 is in particular an interior air filter for a motor vehicle.

Figure 2:
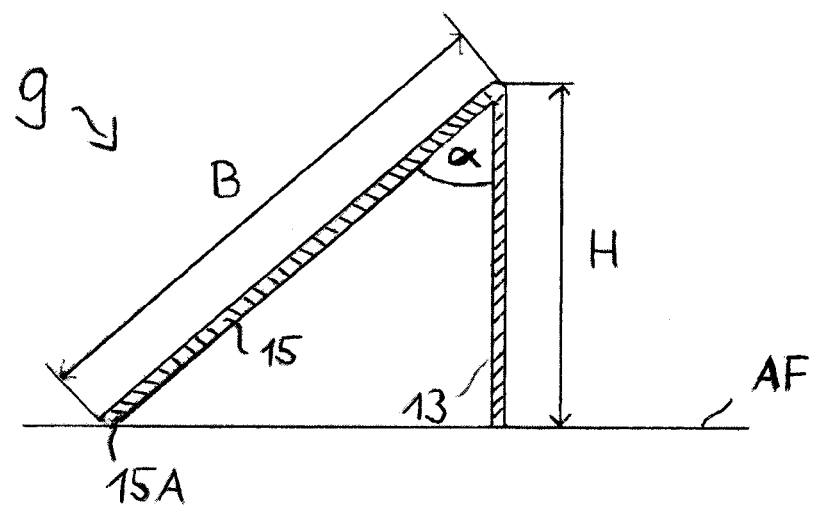
FIG. 2 shows in an exemplary cross-sectional view a material strip.

FIG. 2 shows an exemplary cross-sectional view of a material strip 9 in which the relative size ratios of the first leg 13 and the second leg 15 become apparent. The first leg 13 with the height H and the second leg 15 with the width B in the illustration of FIG. 2 are folded relative to each other such that a tip or terminal edge 15A of the second leg 15 meets an extension of a contact surface AF for the filter element 1 provided in the filter receptacle. In this way, the fold provides an angle $\alpha$ that is an acute angle in the present embodiment. The ratio between B and H is preferably in the range of 1.05 to 2.0 and further preferred in a range of 1.3 to 1.8. In the instant embodiment, the ratio between B and H in FIG. 2 is approximately 1.5.

The filter element 1 cannot be installed in a filter receptacle that has a mounting height or a mounting and removal opening matched to the height H in such a way that the second leg 15 is pressed flat against the first leg 13 because in this case the second leg 15 would project past the filter element 1 and the filter element would not fit. For installing the filter element 1, a filter receptacle should thus be provided that has a matching or geometrically adapted shape. With such a filter receptacle, an installation direction or installation orientation of the filter element in the filter receptacle can thus be predetermined in order to prevent in this way a wrong installation of the filter element. An arrangement is provided that prevents installation of the filter element in a wrong position.

Figure 3:
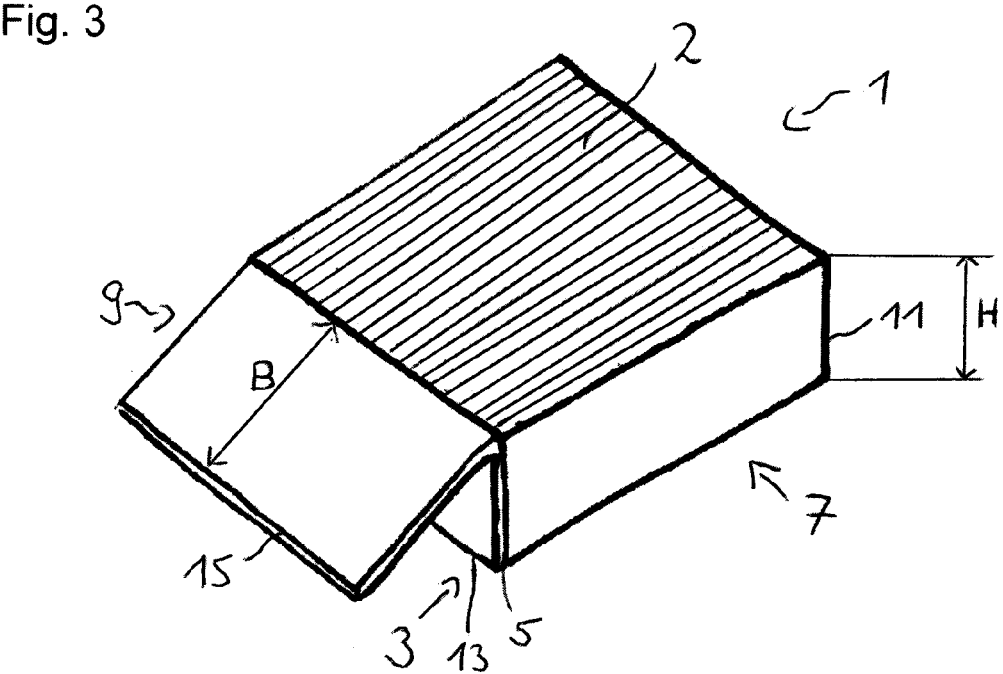
FIG. 3 is a schematic perspective illustration of a further embodiment of a filter element.

FIG. 3 shows a schematic perspective illustration of a further embodiment of a filter element. In deviation from the illustration in FIG. 1, the material strip 9 in the present embodiment is attached to a side band 5 of the fold pack 2. In particular, the first leg 13 of the material strip 9 reinforces the side band 5 of the fold pack 2. As shown in FIG. 1, the width B of the second leg 15 is greater than the height H of the filter element 1 or the fold pack 2.

Figure 4:
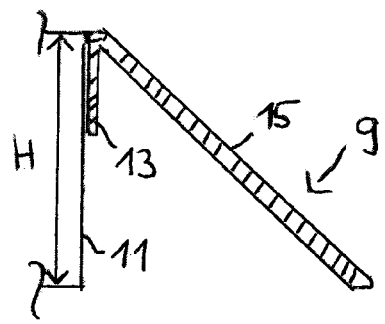
FIG. 4 is a detail view of an embodiment of the filter element with material strip.

FIG. 4 shows a detail illustration of an embodiment of a filter element 1 with material strip 9. In this embodiment, the width of the first leg 13 that is attached to the head band 11 of the filter element 1 is smaller than the height H of the fold pack 2. In this way, the material strip 9 can be produced with less material, in particular, when a separate head band 11 is provided. Of course, this embodiment can also be applied to the embodiment of FIG. 3 so that the short first leg 13 is applied to the side band 5.

Figure 5:
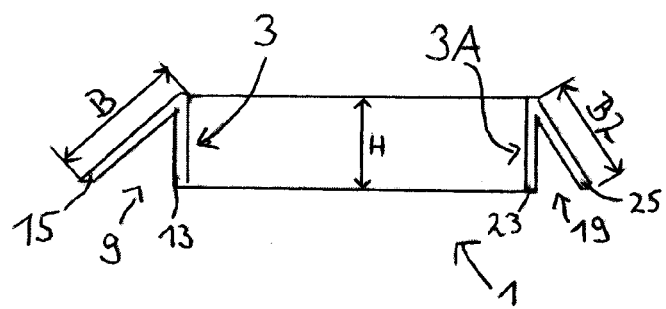
FIG. 5 shows a third embodiment of the filter element.

FIG. 5 shows a further embodiment of a filter element 1 in which in addition to the first material strip 9 a second material strip 19 is provided on an opposite side 3A of the filter element 1. The additional second material strip 19 has a first leg 23 and second leg 25. As in case of the first leg 13 of the first material strip 9, the width of the first leg 23 of the second material strip 19 is matched to the height H of the filter element 1 and is substantially identical to this height H. The second leg 25 has a width B2 that is greater than the height H. In the instant embodiment, the width B2 is smaller than the width B wherein in alternative embodiments the widths B and B2 can be the same or can be selected to be of different size ratios relative to each other.

In FIG. 5, there is no determination whether the material strips 9, 19 are attached to side bands or head bands of the fold pack. Both variants are possible here. In other respects, as in the afore described embodiments, the side bands and/or head bands of the fold pack 2 can be formed by the respective first leg 13 or 23 of the first or second material strip so that the configuration of a separate head band or side band is not required. In particular, in this case it is advantageous when the material strip is formed with a sealing material and acts as a sealing strip for the fold pack 2.

Figure 6:
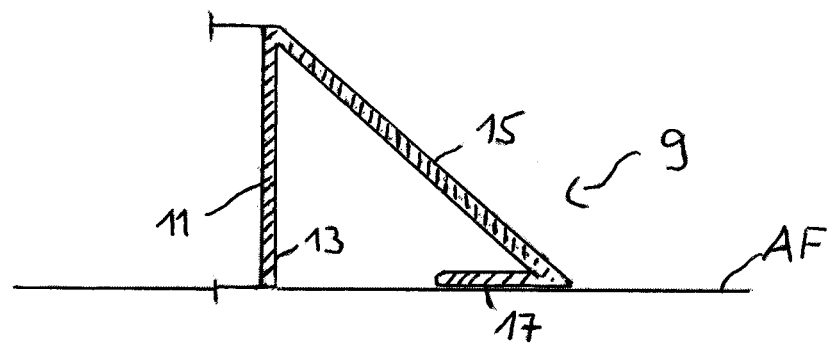
FIG. 6 is a detail view of an embodiment of a filter element with material strip.

FIG. 6 shows a detail illustration of a further embodiment of a filter element 1 with material strip 9. Here, the material strip 9 is embodied with three legs 13, 15, 17 wherein the third leg 17 is formed by a further fold on the second leg 15. The width of the third leg 17 is preferably selected such that it is shorter than the width of the second leg, in particular however in such a way that contacting of the first leg 13 is prevented. Appropriate values can be determined by simple geometric consideration, for example, based on FIG. 6.

By means of the third leg 17, in particular, in an embodiment as a sealing material, an improved sealing action in the mounted state of the filter element can be achieved. The third leg 17 is resting, for example, flat on the contact surface AF.

Figure 7:
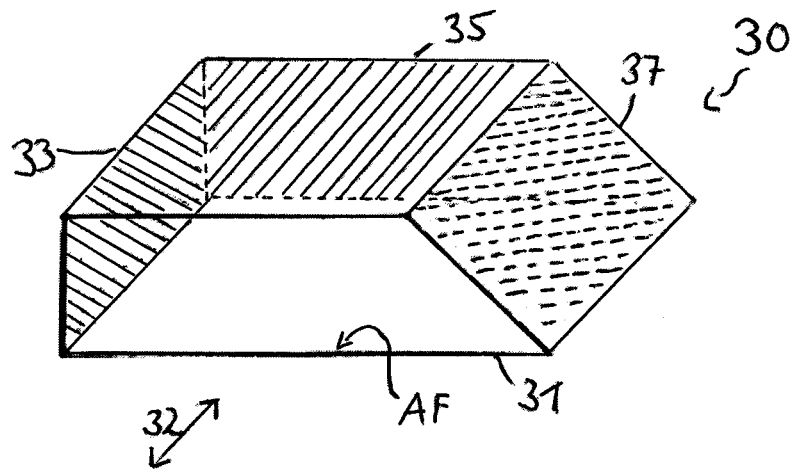
FIG. 7 shows a first embodiment of a filter receptacle.

In FIG. 7, an embodiment of a filter receptacle 30 for filter elements of the afore described configuration is illustrated. The filter receptacle 30 has a mounting and removal opening 31 which has a trapezoidal cross-section, in particular the cross-section of a rectangular trapezoid. Moreover, FIG. 7 shows a predetermined mounting and removal direction 32 as well as lateral and rear walls 33, 35. The filter receptacle 30 has moreover a slanted wall 37 that is positioned at an angle that substantially corresponds to an angle that is defined by the second leg of a material strip of a filter element provided for installation and a contact surface AF for the filter element. In the present embodiment, the slanted wall 37 extends parallel to the mounting and removal direction 32.

Figure 8:
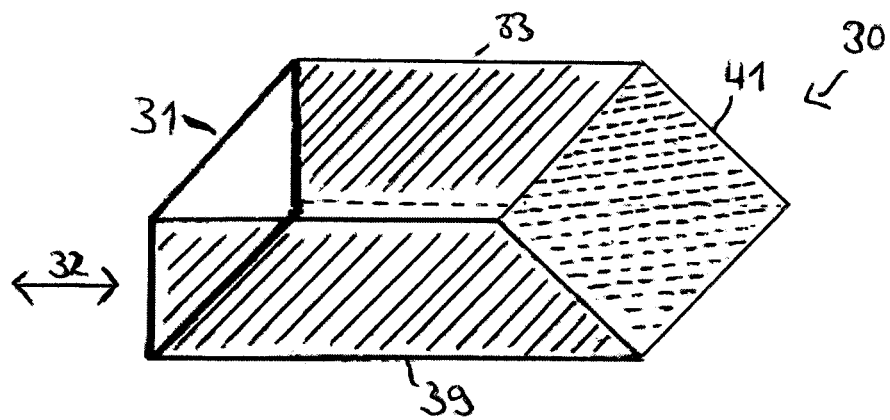
FIG. 8 shows a second embodiment of a filter receptacle.

In FIG. 8 a second embodiment of the filter receptacle is illustrated. The filter receptacle 30 has a mounting and removal opening 31 of a rectangular configuration. The mounting and removal direction 32 extends perpendicularly to the cross-section of the mounting and removal opening 31. The filter receptacle 30 has moreover lateral walls 33, 39 and a slanted wall 41. The slanted wall 41 is positioned opposite the mounting and removal opening 31. Accordingly, it is provided that a filter element is inserted into the filter receptacle 30 in that the side is leading on which the two-leg material strip is attached.

Figure 9:
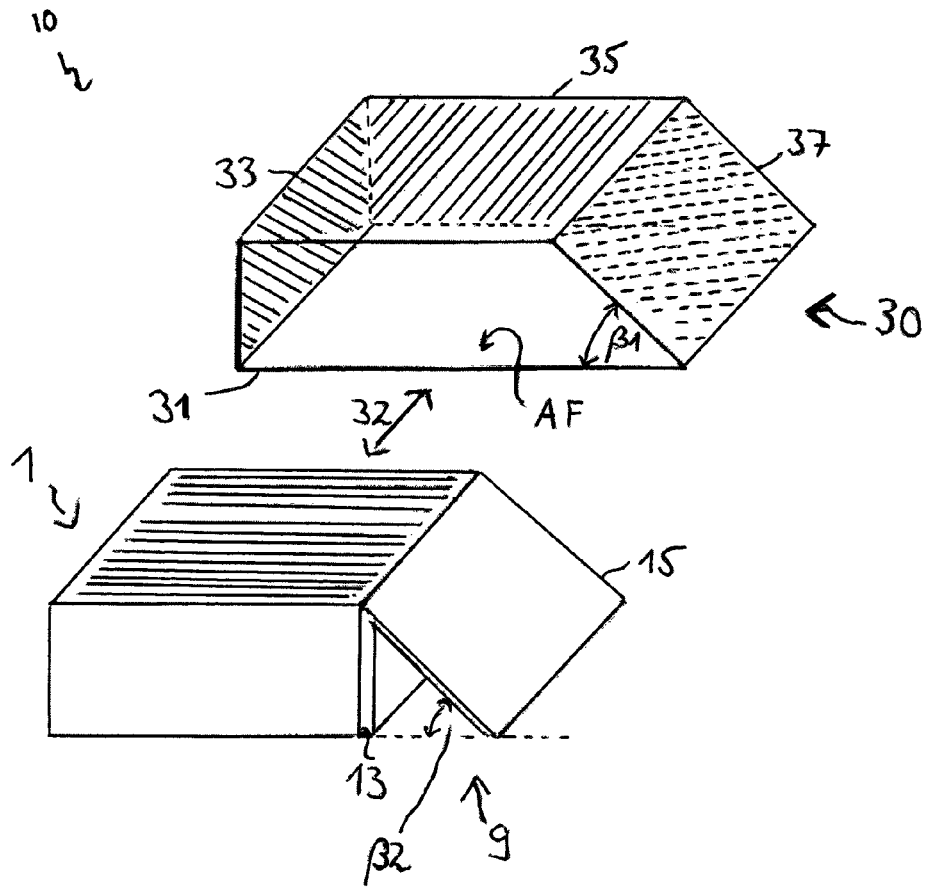
FIG. 9 is a schematic perspective illustration of an embodiment of a filter arrangement with a filter element and a filter receptacle.

FIG. 9 shows a schematic perspective illustration of an embodiment of a filter arrangement 10 with a filter element 1 and a filter receptacle 30. The slanted wall 37 of the filter receptacle 30 extends at an angle β1 to a base surface of the filter receptacle which forms at the same time a contact surface AF for the filter element 1. In the filter element 1, the second leg 15 of the material strip 9 defines with the contact surface AF an angle β2 that is substantially identical to the angle β1. In particular, the angles β1 and β2 can be different from each other due to manufacturing tolerances. Also, in the present case the clearance height of the mounting and removal opening 31 or of the filter receptacle 30 is matched to the height H of the filter element 1. Accordingly, the width B of the second leg 15 corresponds substantially to the corresponding width of the slanted wall 37. Accordingly, an installation with exact fit of the filter element 1 in the filter receptacle 30 is possible. In particular, however, it is achieved that the filter element 1 cannot be inserted in any other orientation than in the illustrated one into the filter receptacle. In this way, a faulty installation of such a filter element 1 in a corresponding housing or receptacle 30 is prevented.

Figure 10:
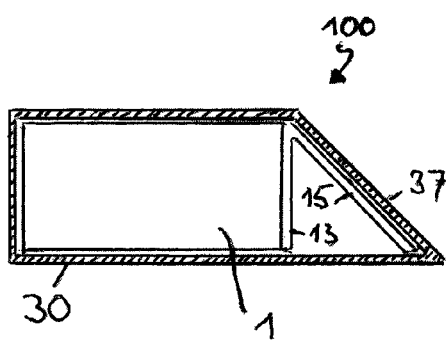
FIG. 10 is a cross-section of a filter arrangement in the mounted state of the filter element.

FIG. 10 shows a cross-section of a filter arrangement 10 with the filter element 1 in the mounted state. In this context, the exact-fit installation of the filter element 1 in the filter receptacle 30 is apparent. In particular, the second leg 15 of the filter element 1 is contacting the slanted wall 37.

Even though the present invention has been explained herein with preferred embodiments, the invention is not limited to these embodiments but can be modified in various ways. Other geometries than the illustrated ones for filter elements and housings can be selected. In this context, the conditions at the installation site of the filter can be taken into account. The aforementioned materials for the side bands and the head bands and the filter medium are to be understood as examples only. The described filter elements are in particular suitable as interior air filters for motor vehicles.

While specific embodiments of the invention have been shown and described in detail to illustrate the inventive principles, it will be understood that the invention may be embodied otherwise without departing from such principles.

What is claimed is:

1. An interior air filter for a motor vehicle, the interior air filter comprising:
    a fold pack having a first side;
    a first material strip comprising a first leg and a second leg, the first material strip disposed on the first side;
    the first leg attached to the first side; and
    the second leg having a width that is greater than a height of the fold pack;
    wherein the first leg lies on and extends on the first side of the fold pack in a flow direction from a first edge to an opposing second edge of the first leg;
    wherein the second leg has a first edge arranged at and connected to the first edge of the first leg, the first edge of the second leg connected by a first flexing fold to the first edge of the first leg;
    wherein the first and second legs of the first material strip form a V-shaped material strip, the V-shaped material strip open an a side opposite the first flexing fold forming an open V-shape from the side opposite the first flexing fold and open up to the first flexing fold such that and angle of the second leg relative to the first leg at the first flexing fold is variable to vary the angle;
    wherein the first material strip consists of the first leg and the second leg and
    wherein an angle defined between the first leg and the second leg is variable.

2. The interior air filter according to claim 1, wherein the first material strip forms at least partially a head band or a side band of the fold pack.

3. The interior air filter according to claim 1, wherein the first material strip has a fold arranged between the first leg and the second leg.

4. The interior air filter according to claim 3, wherein the fold is positioned at a top edge or a bottom edge of the fold pack.

5. The interior air filter according to claim 1, wherein a ratio of the width of the second leg to the height of the fold pack is 1.05 to 2.0.

6. The interior air filter according to claim 5, wherein the ratio of the width of the second leg to the height of the fold pack is 1.3 to 1.8.

7. The interior air filter according to claim 1, comprising a second material strip,
    wherein the fold pack has a second side and
    wherein the second material strip comprises
        a first leg and
        a second leg,
    wherein the first leg of the second material strip is attached to the second side and
    wherein the second leg of the second material strip has a width that is greater than the height of the fold pack.

8. An interior air filter for a motor vehicle, the interior air filter comprising:
    a fold pack having a first side;
    a first material strip comprising a first leg and a second leg, the first material strip disposed on the first side;
    the first leg attached to the first side; and
    the second leg having a width that is greater than a height of the fold pack;
    wherein the first leg lies on and extends on the first side of the fold pack in a flow direction from a first edge to an opposing second edge of the first leg;
    wherein the second leg has a first edge arranged at and connected to the first edge of the first leg, the first edge of the second leg connected by a first flexing fold to the first edge of the first leg;
    wherein the first and second legs of the first material strip form a V-shaped material strip, the V-shaped material strip open an a side opposite the first flexing fold forming an open V-shape from the side opposite the first flexing fold and open up to the first flexing fold such that and angle of the second leg relative to the first leg at the first flexing fold is variable to vary the angle;
    wherein the first material strip comprises a third leg,
    wherein an angular point between the second leg and the third leg is positioned on an end of the second leg that is facing away from the first leg.

9. A filter arrangement comprising
an interior air filter comprising
  a fold pack having a first side;
  a first material strip comprising a first leg and a second leg, the first material strip disposed on the first side;
  the first leg attached to the first side; and
  the second leg having a width that is greater than a height of the fold pack;
  wherein the first leg lies on and extends on the first side of the fold pack in a flow direction from a first edge to an opposing second edge of the first leg;
  wherein the second leg has a first edge arranged at and connected to the first edge of the first leg, the first edge of the second leg connected by a first flexing fold to the first edge of the first leg;
  wherein the first and second legs of the first material strip form a V-shaped material strip, the V-shaped material strip open an a side opposite the first flexing fold forming an open V-shape from the side opposite the first flexing fold and open up to the first flexing fold such that and angle of the second leg relative to the first leg at the first flexing fold is variable to vary the angle; and
a filter receptacle that comprises
  a slanted wall;
  a mounting and removal opening through which the interior air filter is inserted or removed from the filter receptacle in a mounting and removal direction; and
  a contact surface for the interior air filter;
  wherein the slanted wall extends at an angle that corresponds substantially to an angle defined by the second leg of the first material strip of the interior air filter and the contact surface.

10. The filter arrangement according to claim 9, wherein, in a mounted position of the interior air filter, the second leg of the first material strip contacts the slanted wall.

11. The filter arrangement according to claim 9, wherein the interior air filter is arranged in the filter receptacle.

* * * * *